United States Patent [19]
Ogawa

[11] Patent Number: 5,512,997
[45] Date of Patent: Apr. 30, 1996

[54] DISTANCE MEASURING DEVICE

[75] Inventor: Kimiaki Ogawa, Tokyo, Japan

[73] Assignee: Asahi Kogaku Kogyo Kabushiki Kaisha, Tokyo, Japan

[21] Appl. No.: 169,200

[22] Filed: Dec. 20, 1993

[30] Foreign Application Priority Data

Dec. 19, 1992 [JP] Japan .................................. 4-356025
Oct. 26, 1993 [JP] Japan .................................. 5-290066

[51] Int. Cl.⁶ ............................. G01C 3/00; G01C 5/00; G03B 3/00
[52] U.S. Cl. ......................... 356/3.04; 354/403; 356/3.08
[58] Field of Search .................................. 356/3.03, 3.06, 356/3.08, 3.04; 354/403

[56] References Cited

U.S. PATENT DOCUMENTS

| | | | |
|---|---|---|---|
| 4,320,302 | 3/1982 | Stein | 356/1 |
| 4,968,146 | 11/1990 | Heizmann et al. | 356/1 |
| 5,001,508 | 3/1991 | Ogawa. | |
| 5,361,117 | 11/1994 | Nonaka | 354/403 |

Primary Examiner—Stephen C. Buczinski
Attorney, Agent, or Firm—Greenblum & Bernstein

[57] ABSTRACT

A distance measuring device has an infrared light-emitting diode by which an infrared light is emitted towards a subject, and first and second linear line sensors on which an image corresponding to light reflected from the subject is formed. The first and second linear line sensors are disposed adjacently and in parallel to each other, and offset by an amount corresponding to half of the predetermined A/D converting step. Analog distance data outputted from the linear line sensors are converted to digital distance data using the predetermined A/D converting step, and then, the digital distance data are added together to obtain a subject distance with a high accuracy.

20 Claims, 6 Drawing Sheets

DISTANCE MEASURING DEVICE

BACKGROUND OF THE INVENTION

1. Field of the Invention

The present invention relates to a distance measuring device by which a distance between an optical apparatus such as a camera, and a subject is measured.

2. Description of the Related Art

As an active autofocusing distance measuring devices there is known a device in which infrared light is emitted from a camera to a subject and the reflected light from the subject is received by a linear line sensor provided in the devices so that the subject distance between the camera and the subject is sensed based on triangulation.

Namely, an image of light reflected from the subject is formed on the line sensor, and the position on the line sensor at which the image is formed changes in accordance with the subject distance. The line sensor outputs an electric current signal in accordance with the position of the image of the light, and the signal outputted from the line sensor is converted to a digital signal by an A/D converter, which converts the analog signal with a predetermined converting step to obtain the digital signal.

In this device, to improve the accuracy of the subject distance measurement, it is necessary that the position of the light spot on the line sensor should be sensed with a high accuracy. However, if the converting step is large, in other words, if the resolution of the A/D converter is low, the digital signal does not change when the analog signal is changed by a small amount and this causes an error in measuring the subject distance.

Conversely, if an A/D converter having a small converting step to give a high resolution is used in the distance measuring device, the current consumption of the device increases and the cost of the device also increases.

SUMMARY OF THE INVENTION

Therefore, the object of the present invention is to provide a distance measuring device by which the distance between an optical apparatus and a subject can be measured with high accuracy, without increasing the current consumption or the cost of the device.

According to the present invention, there is provided a device for measuring the distance between an optical apparatus, such as a camera and a subject, the device comprising an emitting mechanism, a receiving mechanism, an obtaining mechanism, a converting mechanism, and a processing mechanism.

The emitting mechanism emits a beam of a light towards the subject. The receiving mechanism receives the light reflected by the subject and senses the position at which an image of the reflected light is formed. The obtaining mechanism obtains distance data, based on the position of the image, to output the subject distance as an analog signal. The converting mechanism converts the analog distance data to digital distance data with a predetermined converting step. The processing mechanism processes the digital distance data to obtain the subject distance with resolution higher than the predetermined converting step.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
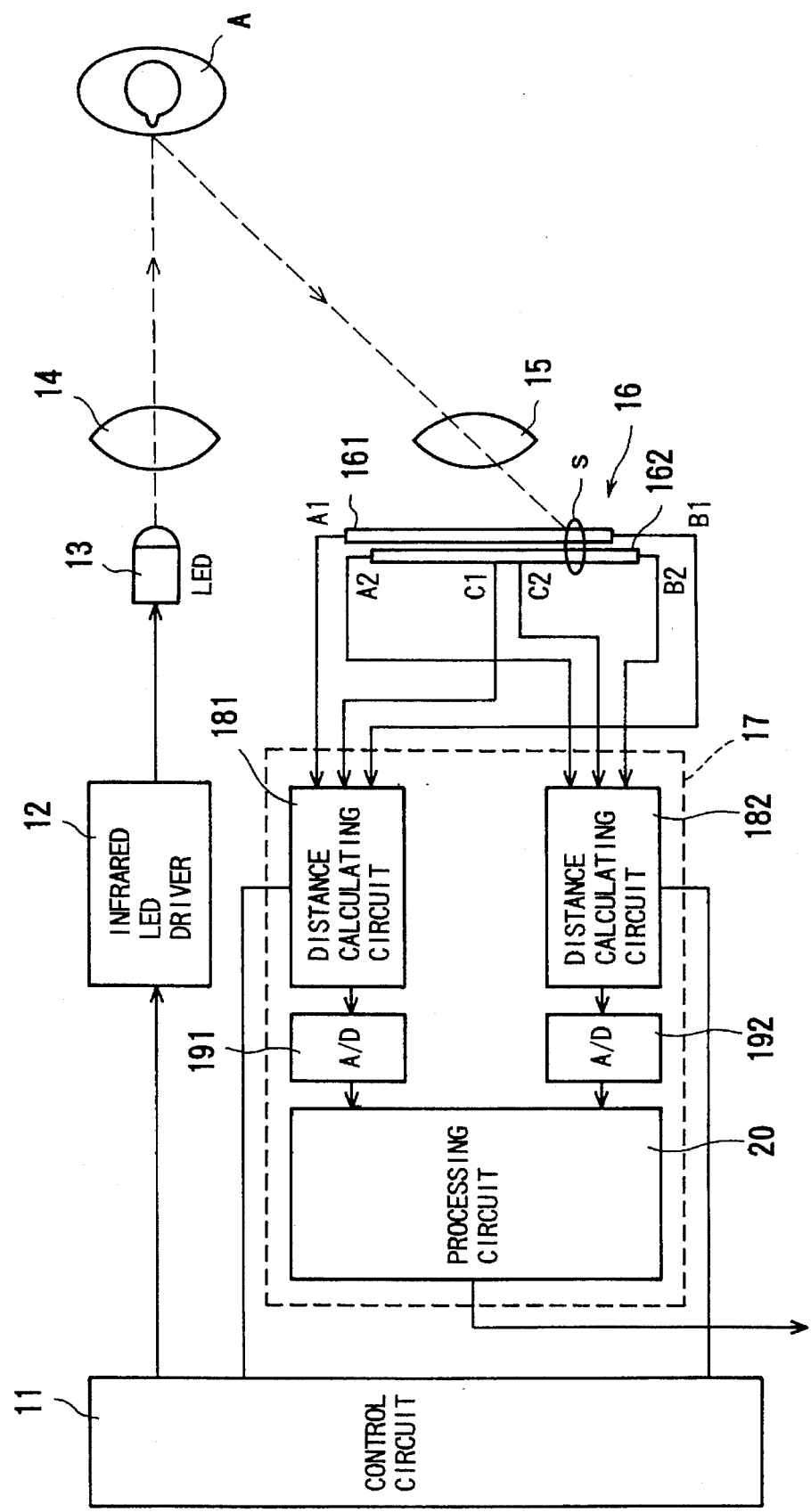
FIG. 1 is a block diagram showing a distance measuring device of a first embodiment of the present invention.

The present invention will now be described with reference to the embodiments shown in the drawings.

FIG. 1 shows a first embodiment of a distance measuring device of the present invention. A control circuit 11 drives an infrared LED driver 12, so that an infrared light-emitting diode 13 generates an infrared light, which is converged by a projection lens 14 and shone onto a subject A. The light reflected by the subject A passes through a receiving lens 15 and is converged onto a position sensor 16.

The position sensor 16 has first and second linear line sensors 161 and 162, which are disposed adjacently and in parallel to each other, and offset in the longitudinal direction thereof by a predetermined amount. The two linear line sensors 161 and 162 are constructed in such a manner that a reflected light spot S converged by the lens 15 is formed on the linear line sensors 161 and 162 at the same time.

The first linear line sensor 161 is provided with a first electrode A1, a second electrode B1, and a common electrode C1. When the light spot S is formed on the linear line sensor 161, electric currents are outputted from the first electrode A1 and the second electrode B1. The amplitude of the electric currents changes in accordance with the position of the light spot S. Similarly, the linear line sensor 162 is provided with a first electrode A2, a second electrode B2, and a common electrode C2, and the operation thereof is the same as the linear line sensor 161.

Namely, each of the linear line sensors 161 and 162 is a single position sensitive device (PSD), and outputs an analog signal that changes in accordance with the position of the light spot S.

The first electrodes A1 and A2, the second electrodes B1 and B2, and the common electrodes C1 and C2 are connected to a distance calculation unit 17, which includes first and second distance calculating circuits 181 and 182, first and second A/D converters 191 and 192, and a processing circuit 20. The first and second distance calculating circuits 181 and 182 are controlled by the control circuit 11.

The first distance calculating circuit 181 is connected to the first, second and common electrodes A1, B1 and C1 of the linear line sensor 161. The second distance calculating circuit 182 is connected to the first, second and common electrodes A2, B2 and C2 of the linear line sensor 162.

In the first distance calculating circuit 181, a ratio of the electric current I1 outputted by the first electrode A1 to the electric current I2 outputted by the second electrode B1 is obtained, and the position of the light spot S is calculated based on the ratio I1/I2. Then, the subject distance data corresponding to the subject distance between the distance measuring device and the subject A is calculated based on the position of the light spot S in accordance with triangulation, and outputted as analog distance data to the A/D converter 191.

Similarly, in the second distance calculating circuit 182, a ratio of the electric current I1 outputted by the first electrode A2 to the electric current I2 outputted by the second electrode B2 is obtained, and the position of the light spot S is calculated based on the ratio I1/I2. Then, the subject distance data is calculated based on the position of the light spot S, and outputted as analog distance data to the A/D converter 192.

The analog distance data are converted to digital distance data by the A/D converters 191 and 192, which have the same resolutions as each other, and carry out A/D conversion with the same converting standard. Namely, these A/D converters 191 and 192 output substantially the same digital signals when subject distance data inputted to the A/D converters 191 and 192 have the same values.

The digital distance data are inputted into the processing circuit 20, which has an adder for adding the subject distance data together.

Figure 2:
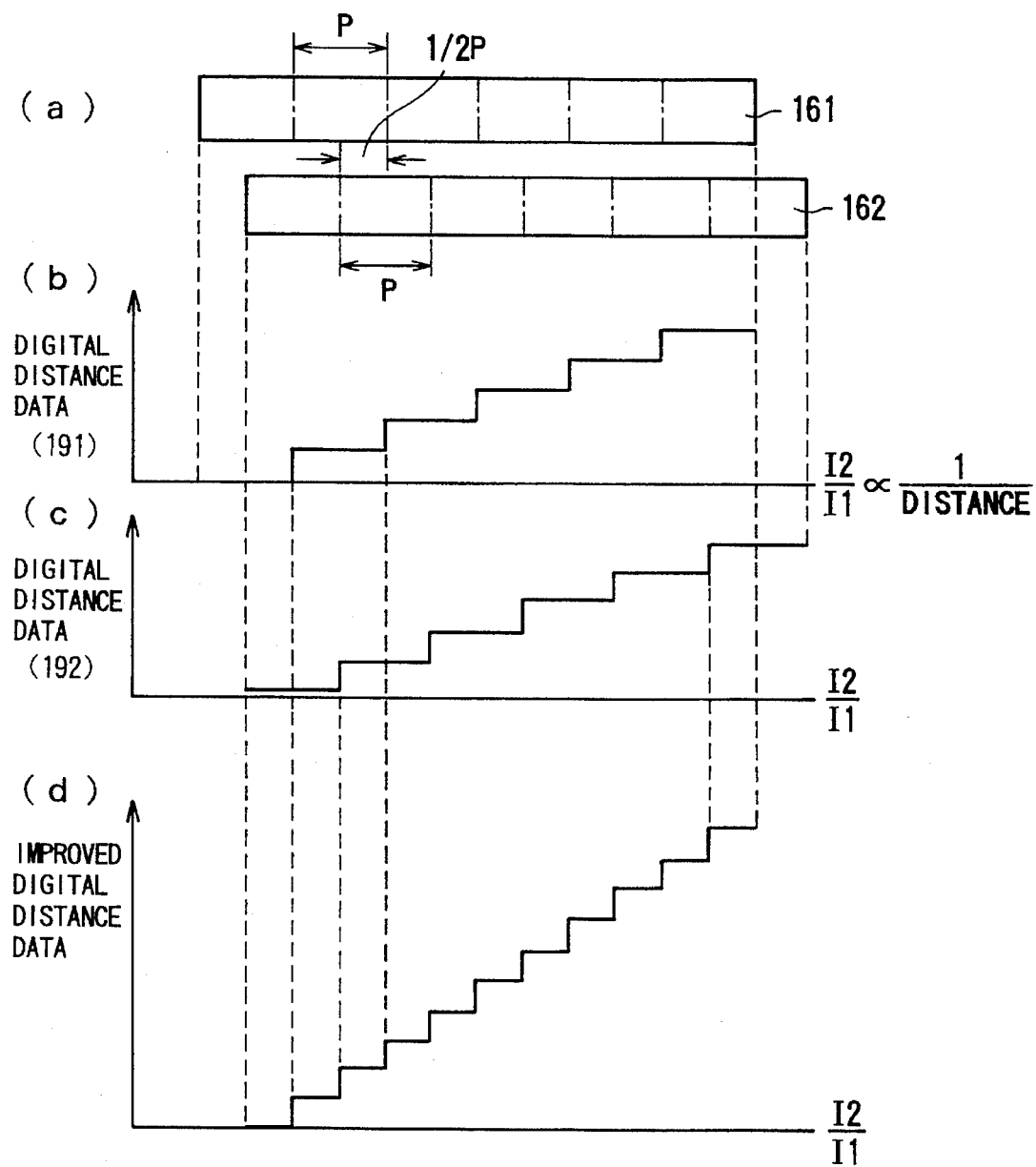
FIG. 2 is a diagram showing an offset of linear line sensors, and an output signal of the linear line sensors.

As shown in FIG. 2, output signals of the linear line sensors 161 and 162 are A/D converted with a converting step P. Namely, when the analog distance data obtained by the distance calculating circuits 181 and 182 are A/D converted by the A/D converters 191 and 192, the output signals of the A/D converters 191 and 192 are increased for each increase of the analog distance data corresponding to the step P.

The linear line sensors 161 and 162 are offset in the longitudinal direction by a predetermined amount, and therefore, the linear line sensors 161 and 162 output different analog signals from each other. These analog signals are A/D converted by the A/D converters 191 and 192 operating with the same A/D converting standards as described above. The offset amount of the linear line sensors 161 and 162 is a half of the converting step P, as shown in FIG. 2 (a). Accordingly, the digital distance data outputted by the first A/D converter 191 (FIG. 2 (b) and the digital distance data outputted by the first A/D converter 192 (FIG. 2 (c) are offset by a half of the converting step.

These digital distance data are added to each other by the processing circuit 20, so that improved digital distance data having the step characteristics shown in FIG. 2 (d) is obtained. Namely, the improved digital distance data is changed for each increase of a half of the converting step P, and therefore, the improved digital distance data has substantially the same accuracy as that in which the analog distance data is A/D converted by an A/D converter having double the resolution of the A/D converters 191 and 192.

Note, for simplifying the description, FIG. 2 shows a case in which each of the A/D converters 191 and 192 outputs 6 digital values.

Thus, since the improved digital distance data has almost the same resolution as that obtained by an A/D converter having double the resolution of the A/D converters 191 and 192, even if the A/D converters 191 and 192 have the usual resolutions, the distance measurement is carried out with the double accuracy, whereby an expensive A/D converter having high resolution need not be provided. Accordingly, the cost of the distance measuring device can be reduced and the current consumption can also be reduced.

Figure 3:
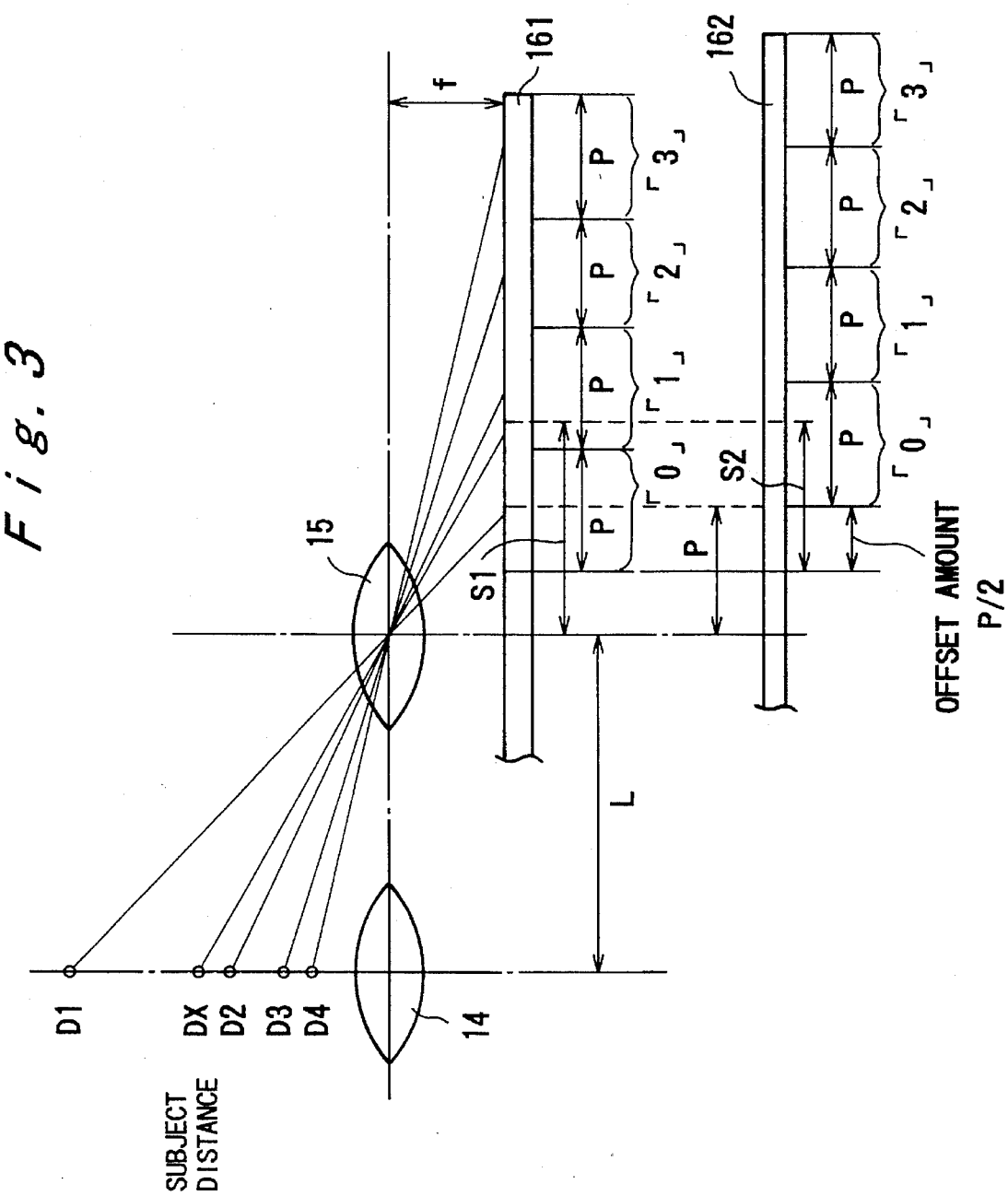
FIG. 3 is a diagram showing a positional relationship between the linear line sensors.

FIG. 3 shows a positional relationship between the linear line sensors 161 and 162. With reference to this drawing, the offset amount of the linear line sensors 161 and 162 is described below. In the example shown in this drawing, the subject distance data is A/D converted in four steps, that is, is converted to the subject distances D1 through D4 (D2=D1/2, D3=D1/3, D4=D1/4).

The subject distance DX, the distance L between the lenses 14 and 15, the focal length f of the lens 15, and the position S1 of the light spot formed on the first linear line sensor 161 have the relationship DX: L=f:S1. Namely, DX=L×(f/S1). By converting this analog data DX to digital data, "1" is obtained in accordance with the position S1 of the light spot. Similarly, in the second linear line sensor 162, DX=L×(f/S2) is obtained in accordance with the position S2 of the light spot. By converting this analog data DX to a digital data, "0" is obtained in accordance with the position S2 of the light spot.

When the output signals of the A/D converters 191 and 192 (FIG. 1) are added to each other, the resulting signal changes with a uniform step width, if the linear line sensors 161 and 162 are offset by a half of the converting step P, i.e., P/2. Thus, the offset amount of the linear line sensors 161 and 162 is set at P/2 in the embodiment.

Figure 4:
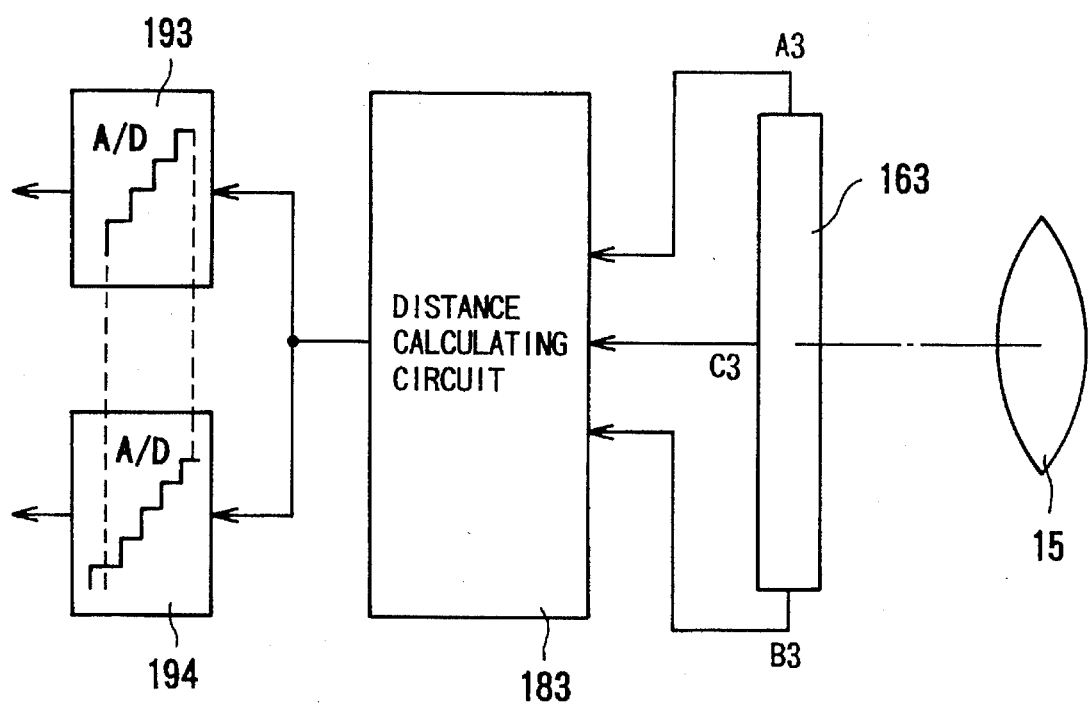
FIG. 4 is a block diagram showing a distance measuring device of a second embodiment.

FIG. 4 shows a second embodiment, in which a position sensor having a single linear line sensor 163, a single distance calculating circuit 183, and two A/D converters 193 and 194 are provided. The single distance calculating circuit 183 is connected to the linear line sensor 163 and the A/D converters 193 and 194.

The linear line sensor 163 has the same construction as the linear line sensors of the first embodiment. Signals outputted from electrodes A3, B3 and C3 of the linear line sensor 163 are inputted to the distance calculating circuit 183, so that analog distance data is obtained. The analog distance data is inputted into the A/D converters 193 and 194, respectively. In the A/D converting standard with which analog data is converted to digital data, the first A/D converter 193 is offset by a half of the converting step, relative to the second A/D converter 194. Therefore, the same analog data are converted by the A/D converters 193 and 194 to digital data different from each other by a half of the converting step. Accordingly, when the output data of the A/D converters 193 and 194 are added, the digital data has double the resolution in comparison with a case in which one A/D converter is provided.

Since this embodiment is constructed in such a manner that the position sensor includes only one linear line sensor 163, the construction of the distance measuring device is simple. Namely, a complex construction in which two linear line sensors are disposed with offsetting by ½ pitch as in the first embodiment is not needed.

Figure 5:
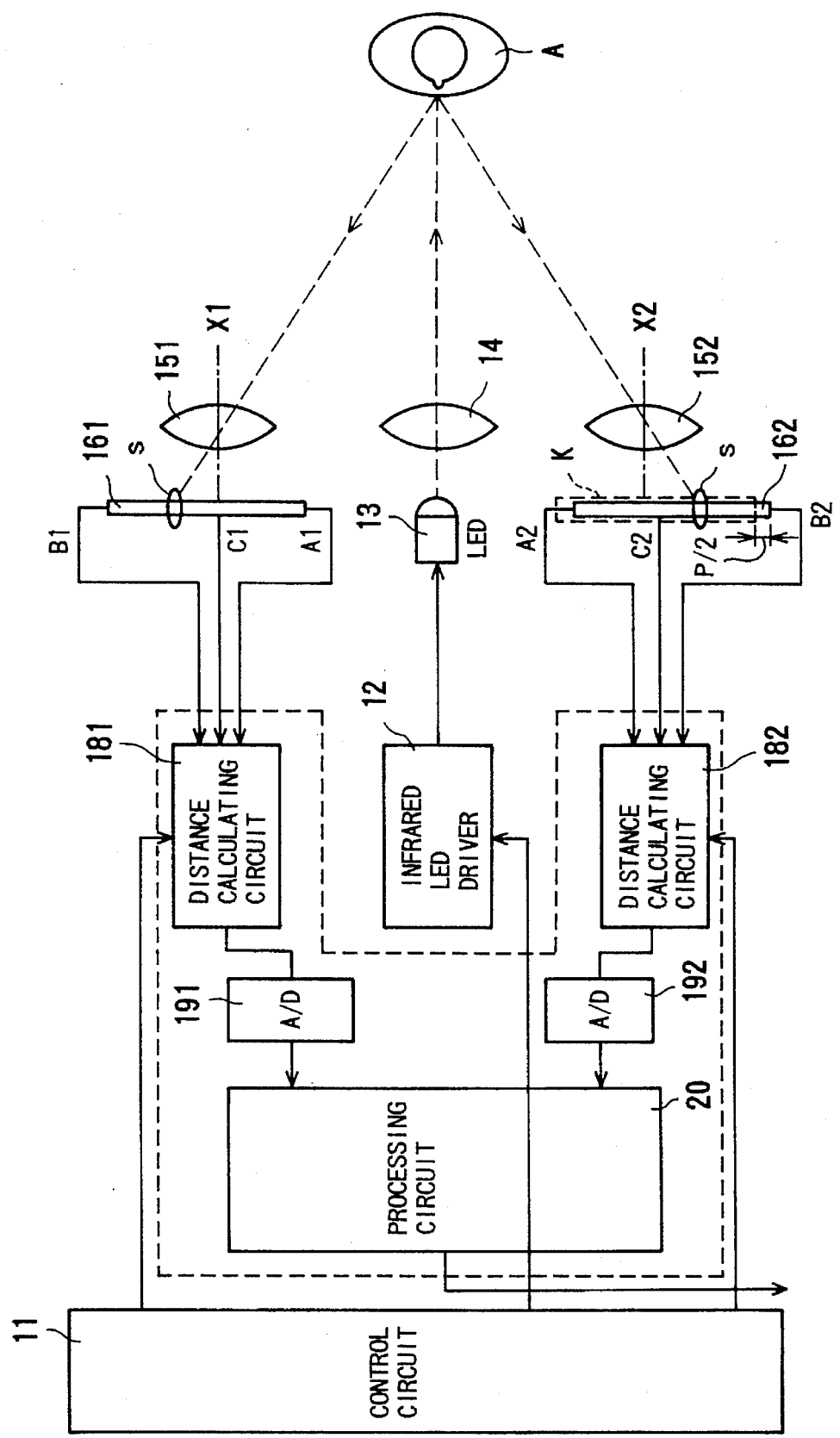
FIG. 5 is a block diagram showing a distance measuring device of a third embodiment.

FIG. 5 shows a third embodiment. In this drawing, the corresponding parts to FIG. 1 are indicated by the same references.

Two light receiving lenses 151 and 152 are disposed at symmetrical positions with respect to a projection lens 14. Linear line sensors 161 and 162 are separate position sensitive sensors, and disposed behind the light receiving lenses 151 and 152, respectively. Supposing that the relative position of the first linear line sensor 161 to the optical axis X1 of the light receiving lens 151 is the basis, the second linear line sensor 162 is offset from the optical axis of the light receiving lens 152 by a half of the converting step of each of A/D converters 191 and 192. The broken line K indicates a state in which the center position of the linear line sensor 162 is coincident with the optical axis X2 of the light receiving lens 152, and the linear line sensor 162 is offset from this state by a half of the converting step P, similar to the above embodiments.

Distance calculating circuits 181 and 182 are connected to the linear line sensors 161 and 162, respectively, and the A/D converters 191 and 192 are connected to the distance calculating circuits 181 and 182, respectively. Output data from the A/D converters 191 and 192 are inputted into a processing circuit 20 and added to each other.

In this embodiment, the reflecting lights from the subject A pass through the light receiving lenses 151 and 152, and thus the light spots S are formed on the linear line sensors 161 and 162, relative. As described above, the position of the light spot S on the second linear line sensor 162 is offset from the center position of the linear line sensor 162 relatively to the optical axis of the light receiving lens 152 by a half of the converting step of each of the A/D converters 191 and 192. Therefore, electric currents outputted from the linear line sensors 161 and 162 have different values from each other by the amount corresponding to a half of the converting step.

Therefore, based on the output data of the linear line sensors 161 and 162, analog distance data are obtained by the distance calculating circuits 181 and 182, and converted to digital distance data by the A/D converters 191 and 192. The digital distance data are added to each other by the processing circuit 20, and thus, a subject distance having double the resolution of each of the A/D converters 191 and 192 is obtained, whereby a distance measurement of a high accuracy can be attained, similar to the above embodiments.

Figure 6:
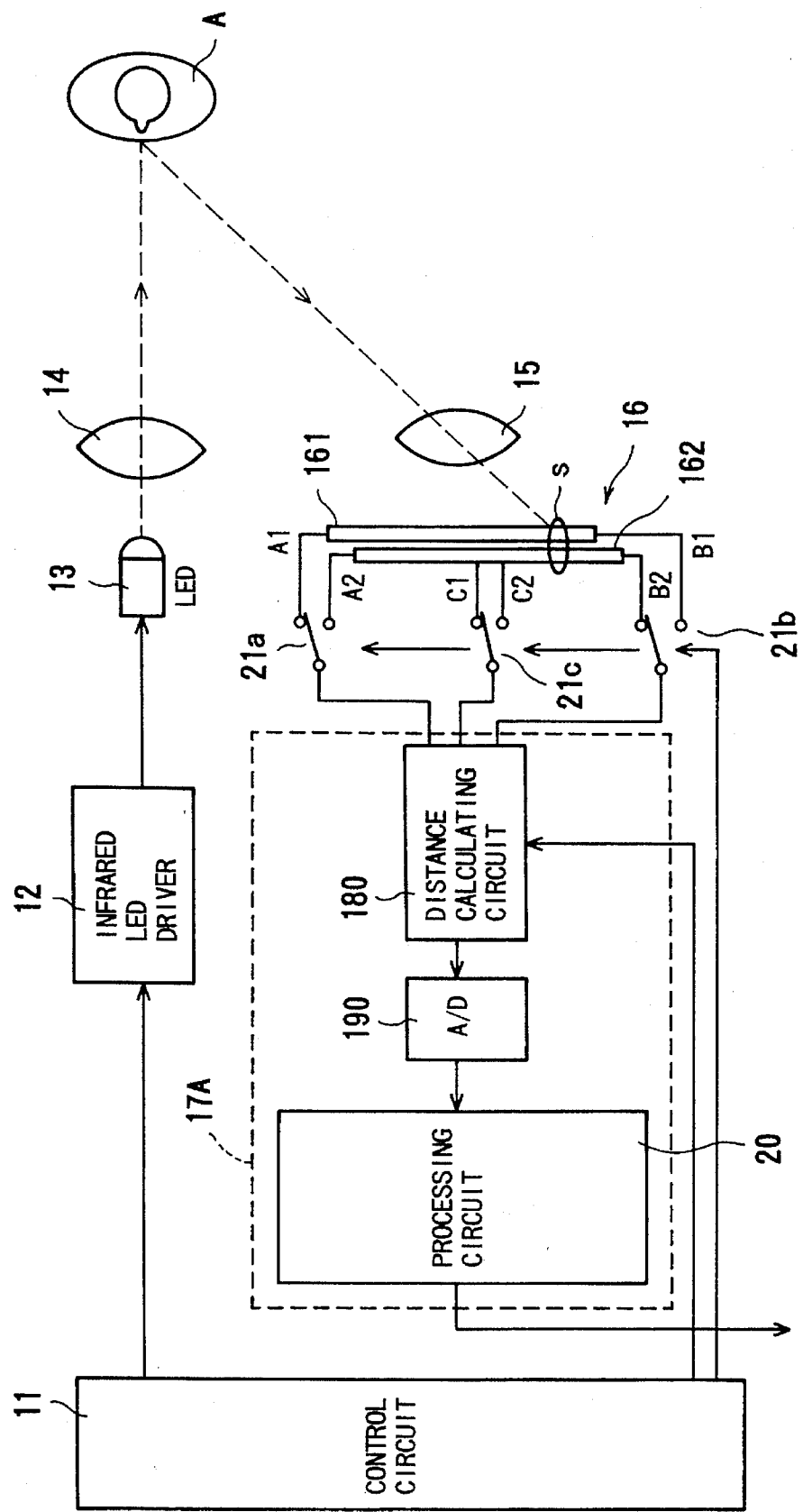
FIG. 6 is a block diagram showing a distance measuring device of a fourth embodiment.

FIG. 6 shows a fourth embodiment. In this drawing, the corresponding parts to FIG. 1 are indicated by the same references.

In this embodiment, a construction of a distance calculation unit 17A is simplified in comparison with the distance calculation unit 17 of the first embodiment (FIG. 1).

Namely, the distance calculation unit 17A is provided with a single distance calculating circuit 180, a single A/D coverter 190, and a processing circuit 20. The distance calculation unit 17A is connected to the linear line sensors 161 and 162 through switches 21a, 21b, and 21c. Switch 21a is provided for connecting the distance calculating circuit 180 to a first electrode A1 of the linear line sensor 161 and a first electrode A2 of the linear line sensor 162. Switch 21b is provided for connecting the distance calculating circuit 180 to a second electrode 81 of the linear line sensor 161 and a second electrode B2 of the linear line sensor 162. Switch 21c is provided for connecting the distance calculating circuit 180 to a common electrode C1 of the linear line sensor 161 and a common electrode C2 of the linear line sensor 162.

Switches 21a, 21b, and 21c are analog switches formed by semi-conductor elements, for example, and controlled by the control circuit 11, so that one of the linear line sensors 161 and 162 must be electrically connected to the distance calculating circuit 190.

Notes although the distance calculating circuit 180 and the A/D converter 190 have the same functions as those of each of the above embodiments, the processing circuit 20 is provided with a memory in which a result of a distance calculation is temporarily stored.

In the fourth embodiment, the reflecting light from the subject A passes through the receiving lens 15, so that the light spot S is formed on the linear line sensors 161 and 162, and electric currents are outputted through the electrodes of the linear line sensors 161 and 162. Switches 21a, 21b and 21c are first switched to the linear line sensor 161, so that the output signals of the linear line sensor 161 are inputted into the distance calculating circuit 180, and thus a first digital distance data obtained by the A/D converter 190 is stored in the memory of the processing circuit 20. Then, switches 21a, 21b and 21c are switched to the linear line sensor 162, so that the output signals of the linear line sensor 162 are inputted into the distance calculating circuit 180, and thus a second digital distance data obtained by the A/D converter 190 is stored in the memory of the processing circuit 20.

In the processing circuit 20, the first and second digital distance data are added to each other, so that a subject distance having double the resolution of the A/D converter 190 is obtained.

In the fourth embodiment, although switches 21a, 21b and 21c should be provided, since the distance calculation unit 17A can be constructed of the single distance calculating circuit 180, the single A/D coverter 190, and the single processing circuit 20, the size of the distance calculation unit 17A is reduced. Usually, although the distance calculation unit is bulky and expensive, according to the fourth embodiment, since the distance calculation unit 17A has a simple constructions it can be manufactured at low cost.

Note, although the linear line sensors 161 and 162 are integrally constructed, these sensors 161 and 162 may be separately constructed as shown in FIG. 5.

Further note, switches 21a, 21b and 21c may be mechanical switches.

Although the embodiments of the present invention have been described herein with reference to the accompanying drawings, obviously many modifications and changes may be made by those skilled in this art without departing from the scope of the invention.

I claim:

1. A device for measuring a subject distance between an optical apparatus and a subject, said device comprising:

means for emitting a beam of light towards said subject;

a plurality of line sensors arranged parallel to one another and offset from each other in a longitudinal direction by a predetermined amount, said plurality of line sensors receiving light reflected from said subject and for sensing a position at which an image of said reflected light is formed;

means for obtaining a subject distance data based on said position and to output said subject distance data as analog distance data;

means for converting said analog distance data to digital distance data with a predetermined converting step; and means for processing said digital distance data to obtain said subject distance with a resolution higher than a resolution of said predetermined converting step.

2. A device according to claim 1, wherein said image of said reflected light is simultaneously formed on each of said plurality of line sensors.

3. A device according to claim 1, wherein said predetermined amount comprises a half of said predetermined converting step.

4. A device according to claim 1, wherein said obtaining means comprises a plurality of distance calculating circuits connected to said line sensors, said converting means comprises a plurality of A/D converters connected to said distance calculating circuits, and said processing means combines the data outputted by said A/D converters together.

5. A device according to claim 1, wherein said obtaining means comprises a single distance calculating circuit connected to said line sensors, said converting means comprises a single A/D converter connected to said distance calculating circuit, and said processing means comprises a memory for storing data outputted from said A/D converter and combines said data stored in said memory together.

6. A device according to claim 1, wherein said plurality of line sensors are disposed at generally symmetrical positions with respect to said emitting means, but offset with respect to each other by said predetermined amount.

7. A device according to claim 6, wherein said predetermined amount comprises a half of said predetermined converting step.

8. A device according to claim 6, wherein said obtaining means comprises a plurality of distance calculating circuits connected to said plurality of line sensors, said converting means comprises a plurality of A/D converters connected to said distance calculating circuits, and said processing means adds together data outputted by said plurality of A/D converters.

9. A device for measuring a subject distance between an optical apparatus and a subject, said device comprising:

means for emitting a beam of light towards said subject;

a single line sensor that receives light reflected from said subject, said single line sensor sending a position at which an image of said reflected light is formed;

means for obtaining subject distance data based on said position and for outputting said subject distance data as analog distance data;

means for converting said analog distance data to a plurality of digital distance data with a predetermined converting step; and means for processing said digital distance data to obtain said subject distance with a resolution higher than said predetermined converting step, wherein said plurality of said digital distance data is offset by a fractional amount of said predetermined converting step.

10. A device according to claim 9, wherein said obtaining means comprises a single distance calculating circuit connected to said single line sensor, said converting means comprising a plurality of A/D converters connected to said distance calculating circuit and having converting standards offsetting each other by an amount equal to 1/N of said converting step, wherein N represents the number of said plurality of A/D converters, and said processing means adds together data outputted by said plurality of A/D converters.

11. A device according to claim 9, wherein said single line sensor has separate position sensitive devices, each of which outputs an analog signal changing in accordance with said position of said image.

12. The device of claim 1, wherein said plurality of line sensors are offset from each other in a first direction by a fraction of said predetermined converting step.

13. A device for measuring a subject distance between an optical apparatus and a subject, said device comprising:

a plurality of line sensors that receive light from said subject and outputs signals related to said subject distance, said plurality of line sensors being positioned parallel to one another and offset from each other in a first direction by an amount equal to a fraction of a predetermined converting step;

at least one distance calculating circuit that calculates analog distance data based on said signals output by said plurality of line sensors;

at least one A/D converter that converts said analog distance data to digital distance data with said predetermined converting step; and a processing circuit that processes said digital distance data to obtain said subject distance with a resolution higher than a resolution of said predetermined converting step.

14. The device of claim 13, wherein said plurality of line sensors comprise a first line sensor and a second line sensor that are disposed at symmetrical positions with respect to a projection lens that emits light to irradiate said subject, a distance between said second line sensor and said projection lens exceeding a distance between said first line sensor and said projection lens by said predetermined amount.

15. The device of claim 13, wherein said at least one distance calculating circuit comprises a single distance calculating circuit and said at least one A/D converter comprises a single A/D converter, and further comprising a switching unit that selectively connects an output of each of said plurality of line sensors to said single distance calculating circuit.

16. The device of claim 13, wherein said fraction of a converting step comprises 1/N, where N represents the number of line sensors.

17. The device of claim 13, further comprising an infrared emitter that irradiates said subject with light, said light being reflected to said plurality of line sensors.

18. The device of claim 13, wherein said processing circuit combines said digital distance data to obtain said higher resolution subject distance.

19. A device for measuring a subject distance between an optical apparatus and a subject, said device comprising:

a single line sensor that receives light from said subject and outputs signals related to said subject distance;

a distance calculating circuit that calculates analog distance data based on said signals output by said single line sensor;

at least one A/D converter that converts said analog distance data to digital distance data with a predetermined converting step; and a processing circuit that combines a plurality of said digital distance data, said plurality of said digital distance data being offset by a fractional amount of said predetermined converting step to obtain said subject distance with a resolution higher than a resolution of said predetermined converting step.

20. The device of claim 19, wherein said fractional amount of said predetermined converting step comprises 1/N, where N represents the number of A/D converters.

* * * * *